(12) United States Patent
Leone

(10) Patent No.: US 6,441,100 B1
(45) Date of Patent: Aug. 27, 2002

(54) VALVE JOINT AND THE PROCESS OF ITS MANUFACTURE

(75) Inventor: Patrice Leone, Acquigny (FR)

(73) Assignee: Valois S.A., Le Neubourg (FR)

( * ) Notice: Subject to any disclaimer, the term of this patent is extended or adjusted under 35 U.S.C. 154(b) by 0 days.

(21) Appl. No.: 09/986,781

(22) Filed: Nov. 9, 2001

(30) Foreign Application Priority Data

Nov. 10, 2000 (FR) .............................................. 00 14530

(51) Int. Cl.$^7$ .................................................. C08F 8/18
(52) U.S. Cl. ................................ 525/329.3; 525/331.7; 525/332.8; 525/332.9; 525/333.1; 525/333.2; 525/356
(58) Field of Search ........................... 525/329.3, 331.7, 525/332.8, 332.9, 333.1, 333.2, 356

(56) References Cited

U.S. PATENT DOCUMENTS

| | | | |
|---|---|---|---|
| 3,563,871 A | | 2/1971 | Newman et al. |
| 3,873,667 A | * | 3/1975 | Preto et al. ............... 525/322.8 |
| 5,274,049 A | | 12/1993 | Zielinski et al. |
| 5,276,094 A | * | 1/1994 | Kaszas et al. ........... 525/332.3 |
| 5,532,299 A | * | 7/1996 | Dubois ........................ 524/184 |
| 6,322,900 B1 | * | 11/2001 | Kiriazis ...................... 525/528 |

FOREIGN PATENT DOCUMENTS

| | | |
|---|---|---|
| EP | 0 071 587 A1 | 2/1983 |
| FR | 2 787 424 | 6/2000 |

OTHER PUBLICATIONS

Database WPI. Week 200103. Derwent Publications Ltd., London, GB. AN 2001–019755; XP002173781; JP 2000–290410 A. Oct. 17, 2000.

* cited by examiner

*Primary Examiner*—Bernard Lipman
(74) *Attorney, Agent, or Firm*—Sughrue Mion, PLLC

(57) ABSTRACT

A valve joint of a dispensing valve of a fluid product dispensing device, said joint being intended to come into contact with a fluid product comprising an aerosol propellant of the HFC-134a or HFC-227 type, with or without alcohol, characterised in that said joint comprises a surface subjected to a surface treatment, said surface treatment being adapted to lower the friction coefficient of the joint so as to reduce the risks of the valve blocking and/or to create a barrier on the joint surface so as to reduce the level of extractables from said joint.

14 Claims, No Drawings

VALVE JOINT AND THE PROCESS OF ITS MANUFACTURE

The present invention relates to a valve joint and the process of its manufacture.

Many fluid product dispensing devices comprise valves, particularly measuring valves, to dispense the product contained in the device, by means of an aerosol propellant. For ecological reasons, conventional aerosol propellants of the CFC type used in the past have been steadily replaced by aerosol propellants, which are less harmful to the environment, such as particularly the gases HFC 134a or HFC-227. The use of these aerosol propellants however brings with it a certain number of problems. On the one hand they place increased stress on the joints, which can bring about more significant swelling, liable to lead to a problem of blocking of the valve which slides within: the joints, a problem generally denoted by the expression "sticking". On the other hand the joint may be led to release compounds known by the term extractables. These extractables are compounds, extracted from the joints by the propellant, which contaminate or pollute the fluid product to be dispensed.

The purpose of the present invention is to provide a joint and a manufacturing process of said joint which does not have the above-mentioned drawbacks.

Another purpose of the present invention is to provide a joint and a process for its manufacture which is simple and inexpensive to carry out.

The purpose of the present invention is to provide a joint, which can be used with HFC-134a or HFC-227 gases, in respect of which the release of extractables is reduced.

Another purpose of the present invention is to provide a joint, which can be used with HFC-134a or HFC-227 gases, which reduce valve blocking problems.

The object of the present invention is therefore a process for manufacturing a valve joint of a dispensing valve of a fluid product dispensing device, said joint being intended to come into contact with a fluid product comprising an aerosol propellant of the HFC-134a or HFC-227 type, with or without alcohol, characterised in that said process includes a joint surface treatment, said surface treatment reducing the friction coefficient of the joint so as to reduce the risks of the valve blocking and/or said surface treatment creating a barrier on the joint surface so as to reduce the level of extractables from said joint.

To advantage, said joint includes one or more of the following materials: nitrile, neoprene, butyl, halobutyl, EPDM (ethylene propylene diene), SBR (styrene butadiene), HNBR (hydrogenated nitrile).

According to a first embodiment of the invention, said surface treatment is of the chemical type.

To advantage, said surface treatment includes grafting halogens on the joint surface.

To advantage, the halogens include chlorine and/or fluorine.

To advantage, said surface treatment includes oxidising the joint surface in a chlorinated medium.

To advantage, said surface treatment includes immersing the joint in a solution containing water, hydrochloric acid and bleach.

According to a second embodiment of the invention, said surface treatment is of the physical type.

To advantage, said surface treatment includes modifying the joint surface by means of electron beams.

To advantage, said surface treatment includes subjecting the joint to an irradiation treatment, the power of which may vary from about 150 KeV to about 10 MeV.

Another object of the present invention is a valve joint of a dispensing valve of a fluid product dispensing device, said joint being intended to come into contact with a fluid product comprising an aerosol propellant of the HFC-134a or HFC-227 type, with or without alcohol, characterised in that said joint comprises a surface subjected to a surface treatment, said surface treatment being adapted to lower the friction coefficient of the joint so as to reduce the risks of the valve blocking and/or to create a barrier on the joint surface so as to reduce the level of extractables from said joint.

To advantage, said joint includes one or more of the following materials: nitrile, neoprene, butyl, halobutyl, EPDM, SBR, HNBR.

According to a first embodiment variant, the joint surface is modified by grafting atoms of chlorine and/or fluorine.

According to a second embodiment variant, the joint surface is irradiated by electron beams, the power of which may vary from about 150 KeV to about 10 MeV.

Other characteristics and advantages of the present invention will emerge more clearly during the following detailed description of two embodiments of the invention, given as non-restrictive examples.

Thus, the object of the invention is a valve joint, particularly a measuring valve joint, for a fluid product dispensing device. This joint may be a static joint or a dynamic joint, in other words a joint in which the valve slides. This joint is intended to be in contact with the fluid product which comprises an aerosol propellant of the HFC-134a or HFC-227 type, with or without alcohol, and the invention provides for the application of a surface treatment to said joint in order on the one hand to reduce the risks of the valve blocking and on the other hand to reduce the level of extractables from the joint.

To reduce the risks of the valve blocking, the surface treatment provides for a lowering of the friction coefficient of the joint, and to reduce the level of extractables from the joint, the surface treatment creates a barrier on the joint surface. These effects may be obtained separately or, preferably, together with the same surface treatment.

The joints of the invention, which may be subjected to the surface treatment, may particularly be constituted by one or more of the following materials: nitrile, neoprene, butyl, halobutyl, EPDM (ethylene propylene diene), SBR (styrene butadiene), HNBR (hydrogenated nitrile). Any combination of these materials may also be used. Clearly, other materials may also be used to make the joints to which the present invention applies.

According to a first embodiment variant, the surface treatment of the joint is of the chemical type. In particular, this surface treatment may include grafting halogens, such as atoms of chlorine and/or fluorine on the joint surface. A means of achieving this is to oxidise the joint surface in a chlorinated medium, for example by immersing the joint in a solution containing water, hydrochloric acid and bleach.

According to a second variant of the invention, the surface treatment may be of the physical type. In particular this surface treatment may include modifying the joint surface by means of electron beams, subjecting the joint to an irradiation treatment, the power of this irradiation being able to vary between about 150 KeV to about 10 MeV, depending on the required performance, such as depth of treatment, speed of treatment, etc.

The table given below shows the effect of the surface treatment on the friction coefficients.

The friction coefficients were measured according to the NFT 54-112 standard. This consists in sliding a rubber material over a given plastic medium. The force required to initiate movement and then to maintain it is then recorded. Two coefficients are deduced from this:
- the static friction coefficient, which characterises slide initiation ($K_s$),
- the dynamic friction coefficient, which characterises continuous slide ($K_d$).

|  | Friction coefficient | |
| --- | --- | --- |
|  | $K_s$ | $K_d$ |
| Untreated nitrile | 1.34 | * |
| Treated nitrile | 0.32 | 0.31 |
| Untreated neoprene | 1.12 | 0.61 |
| Treated neoprene | 0.41 | 0.30 |

*measurement impossible because of too much friction

The table above shows well the very significant effect of the surface treatment of the invention on the friction coefficient, which therefore significantly reduces the risks of sticking, in other words the blocking of the valve.

Although the invention has been described with reference to two particular embodiments of it, it is understood that various modifications may be made to it, by the man skilled in the art, without departing from the framework of the present invention, as set out in the appended claims.

What is claimed is:

1. A process for manufacturing a valve joint of a dispensing valve of a fluid product dispensing device, said joint being intended to come into contact with a fluid product comprising an aerosol propellant of the HFC-134a or HFC-227 type, with or without alcohol, characterised in that said process includes a joint surface treatment, said surface treatment reducing the friction coefficient of the joint so as to reduce the risks of the valve blocking and/or said surface treatment creating a barrier on the joint surface so as to reduce the level of extractables from said joint.

2. A process according to claim 1, wherein said joint includes one or more of the following materials: nitrile, neoprene, butyl, halobutyl, EPDM (ethylene propylene diene), SBR (styrene butadiene), HNBR (hydrogenated nitrile).

3. A process according to claim 1, wherein said surface treatment is of the chemical type.

4. A process according to claim 3, wherein said surface treatment includes grafting halogens on the joint surface.

5. A process according to claim 4, wherein the halogens include chlorine and/or fluorine.

6. A process according to claim 3, wherein said surface treatment includes oxidising the joint surface in a chlorinated medium.

7. A process according to claim 6, wherein said surface treatment includes immersing the joint in a solution containing water, hydrochloric acid and bleach.

8. A process according to claim 1, wherein said surface treatment is of the physical type.

9. A process according to claim 8, wherein said surface treatment includes modifying the joint surface by means of electron beams.

10. A process according to claim 9, wherein said surface treatment includes subjecting the joint to an irradiation treatment, the power of which may vary from about 150 KeV to about 10 MeV.

11. A valve joint of a dispensing valve of a fluid product dispensing device, aid joint being intended to come into contact with a fluid product comprising an aerosol propellant of the HFC-134a or HFC-227 type, with or without alcohol, characterised in that said joint includes a surface subjected to a surface treatment, said surface treatment being adapted to reduce the friction coefficient of the joint so as to reduce the risks of the valve blocking and/or to create a barrier on the joint surface so as to reduce the level of extractables from said joint.

12. A joint according to claim 11, wherein said joint includes one or more of the following materials: nitrile, neoprene, butyl, halobutyl, EPDM, SBR, HNBR.

13. A joint according to claim 11, wherein the joint surface is modified by grafting atoms of chlorine and/or fluorine.

14. A joint according to claim 11, wherein the joint surface is irradiated by electron beams, the power of which may vary from about 150 KeV to about 10 MeV.

\* \* \* \* \*